United States Patent
Lee et al.

(10) Patent No.: US 8,891,382 B2
(45) Date of Patent: Nov. 18, 2014

(54) IMPAIRMENT AWARE PATH COMPUTATION ELEMENT METHOD AND SYSTEM

(75) Inventors: Young Lee, Plano, TX (US); Greg M. Bernstein, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 158 days.

(21) Appl. No.: 13/543,471

(22) Filed: Jul. 6, 2012

(65) Prior Publication Data

US 2013/0010612 A1 Jan. 10, 2013

Related U.S. Application Data

(60) Provisional application No. 61/505,368, filed on Jul. 7, 2011.

(51) Int. Cl.
| | | |
|---|---|---|
| *H04L 12/26* | (2006.01) | |
| *H04J 14/02* | (2006.01) | |
| *H04L 12/717* | (2013.01) | |
| *H04L 12/721* | (2013.01) | |

(52) U.S. Cl.
CPC .............. *H04L 45/62* (2013.01); *H04J 14/0267* (2013.01); *H04L 45/42* (2013.01); *H04L 45/123* (2013.01); *H04J 14/0258* (2013.01); *H04J 14/0257* (2013.01); *H04J 14/0269* (2013.01); *H04J 14/0271* (2013.01); *H04J 14/0212* (2013.01)
USPC .......................................... 370/248; 370/252

(58) Field of Classification Search
USPC ......................................... 370/248, 252, 410
See application file for complete search history.

(56) References Cited

U.S. PATENT DOCUMENTS

2008/0225723 A1 9/2008 Lee et al.

FOREIGN PATENT DOCUMENTS

| EP | 2063585 | * | 5/2009 |
| WO | 2010097049 A1 | | 9/2010 |
| WO | 2011021976 A1 | | 2/2011 |
| WO | WO 2011/072710 | * | 6/2011 |

OTHER PUBLICATIONS y Lee et al. "A Framework for the control of wavelength switched Optical Networks with impairments," RFC 6566, Oct. 22, 2009.*

(Continued)

*Primary Examiner* — Dang Ton
*Assistant Examiner* — Mewale Ambaye
(74) *Attorney, Agent, or Firm* — Conley Rose, P.C.; Grant Rodolph; Brandt D. Howell (57) ABSTRACT

The disclosure includes an apparatus comprising: a path computation element (PCE) comprising a processor configured to: receive a path computation element protocol (PCEP) path computation request from a path computation client (PCC), wherein the path computation request comprises an impairment validation request that directs the PCE to perform an impairment validation of a network path; after receiving the path computation request, compute a network path; and perform an impairment validation of the network path specified by the impairment validation request. In another embodiment, the disclosure includes a method comprising: sending, by a PCC a PCEP path computation request to a PCE, wherein the request directs the PCE to perform routing and wavelength assignment (RWA) and a first impairment validation of a network path, wherein the request comprises a type of signal quality of the network path which indicates the first type of impairment validation to be performed.

25 Claims, 6 Drawing Sheets

(56) References Cited

OTHER PUBLICATIONS

Series G: Transmission Systems and Media, Digital Systems and Networks, Transmission Media Characteristics—Optical Fibre Cables, Characteristics of a Single-Mode Optical Fibre Cable, ITU-T G.652, Oct. 2000, 24 pages.

Series G: Transmission Systems and Media, Digital Systems and Networks, Transmission Media Characteristics—Optical Fibre Cables, Characteristics of a Dispersion-Shifted Single-Mode Optical Fibre Cable, ITU-T G.653, Apr. 1997, 15 pages.

Series G: Transmission Systems and Media, Digital Systems and Networks, Transmission Media Characteristics—Optical Fibre Cables, Characteristics of a Cut-Off Shifted Single-Mode Optical Fibre Cable, ITU-T G.654, Apr. 1997, 13 pages.

Series G: Transmission Systems and Media, Digital Systems and Networks, Transmission Media Characteristics—Optical Fibre Cables, Characteristics of a Non-Zero Dispersion Shifted Single-Mode Optical Fibre Cable, ITU-T G.655, Oct. 1996, 13 pages.

Series G: Transmission Systems and Media, Digital Systems and Networks, Transmission Media Characteristics—Optical Fibre Cables, Characteristics of a Fibre and Cable With Non-Zero Dispersion for Wideband Optical Transport, ITU-T G.656, Dec. 2006, 18 pages.

Series G: Transmission Systems and Media, Digital Systems and Networks, Transmission Media Characteristics—Characteristics of Optical Components and Subsystems, Spectral Grids for WDM Applications: CWDM Wavelength Grid, ITU-T G.694.2, Dec. 2003, 10 pages.

Series G: Transmission Systems and Media, Digital Systems and Networks, Transmission Media Characteristics—Characteristics of Optical Components and Subsystems, Spectral Grids for WDM Applications: DWDM Frequency Grid, ITU-T G.694.1, Jun. 2002, 11 pages.

Lee, Y., Ed., et al., "A Framework for the Control of Wavelength Switched Optical Networks (WSONs) with Impairments," RFC 6566, Mar. 2012, 32 pages.

Foreign Communication From a Related Counterpart Application, International Application No. PCT/US2012/045813, International Search Report dated Feb. 1, 2013, 3 pages.

Foreign Communication From a Related Counterpart Application, International Application No. PCT/US2012/045813, Written Opinion dated Feb. 1, 2013, 8 pages.

* cited by examiner

IMPAIRMENT AWARE PATH COMPUTATION ELEMENT METHOD AND SYSTEM

CROSS-REFERENCE TO RELATED APPLICATIONS

The present application claims priority to U.S. Provisional Patent Application No. 61/505,368 filed Jul. 7, 2011 by Young Lee and Greg Bernstein and entitled "Impairment Aware Path Computation Element Method and System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) during path computation for the various signals that are being transported through the network at any given time. Unlike traditional circuit-switched and connection-oriented packet-switched networks that merely have to determine a route for the data stream across the network, WDM networks are burdened with the additional constraint of having to ensure that the same wavelength is not simultaneously used by two signals over a single fiber. This constraint is compounded by the fact that WDM networks typically use specific optical bands comprising a finite number of usable optical wavelengths. As such, the RWA continues to be one of the challenges in implementing WDM technology in optical networks.

Path computations can also be constrained due to other issues, such as excessive optical noise, along the lightpath. An optical signal that propagates along a path may be altered by various physical processes in the optical fibers and devices, which the signal encounters. When the alteration to the signal causes signal degradation, such physical processes are referred to as "optical impairments." Optical impairments can accumulate along the path traversed by the signal and should be considered during path selection in WSONs to ensure signal propagation, e.g. from an ingress point to an egress point, with an acceptable amount of degradation.

SUMMARY

In one embodiment, the disclosure includes an apparatus comprising: a path computation element (PCE) comprising a processor configured to: receive a path computation element protocol (PCEP) path computation request from a path computation client (PCC), wherein the path computation request comprises an impairment validation request that directs the PCE to perform an impairment validation of a network path; after receiving the path computation request, compute a network path; and perform an impairment validation of the network path specified by the impairment validation request.

In another embodiment, the disclosure includes a method comprising: sending, by a PCC a PCEP path computation request to a PCE, wherein the request directs the PCE to perform routing and wavelength assignment (RWA) and a first impairment validation of a network path, wherein the request comprises a type of signal quality of the network path which indicates the first type of impairment validation to be performed.

In yet another embodiment, the disclosure includes a method comprising: performing, by a PCE, a first impairment validation of a network path; and after performing the first network path impairment validation, sending, by the PCE, a PCEP reply to a network node, wherein the reply comprises a first indicator that indicates whether the first network path impairment validation is successful.

In yet another embodiment, the disclosure includes a method comprising: receiving, by a PCE, a PCEP path computation request (PCReq) message, wherein the PCReq message includes a measure of signal quality to which computed paths should conform.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system, apparatus, and method for performing PCE lightpath impairment validation. A PCC may send a PCEP path computation request to a PCE. The PCEP request may comprise at least one impairment value. The impairment value may comprise data indicating a particular optical signal quality that a computed lightpath should possess and a minimum/maximum threshold value that a computed lightpath's estimated optical signal quality should/ shouldn't exceed. The PCE may perform impairment validation requested by the PCE on each computed lightpath using network impairment data. The PCE may validate the optical signal value of each link of a lightpath or may validate the cumulative optical signal value of the lightpath. The PCE may perform the validation using impairment data already known to the PCE, e.g. stored in a traffic engineering database and/or received directly from other network components, etc. The PCE may send a PCEP reply to the PCC with a computed lightpath and data indicating whether the computed lightpath was successfully validated for each impairment value.

Figure 1:
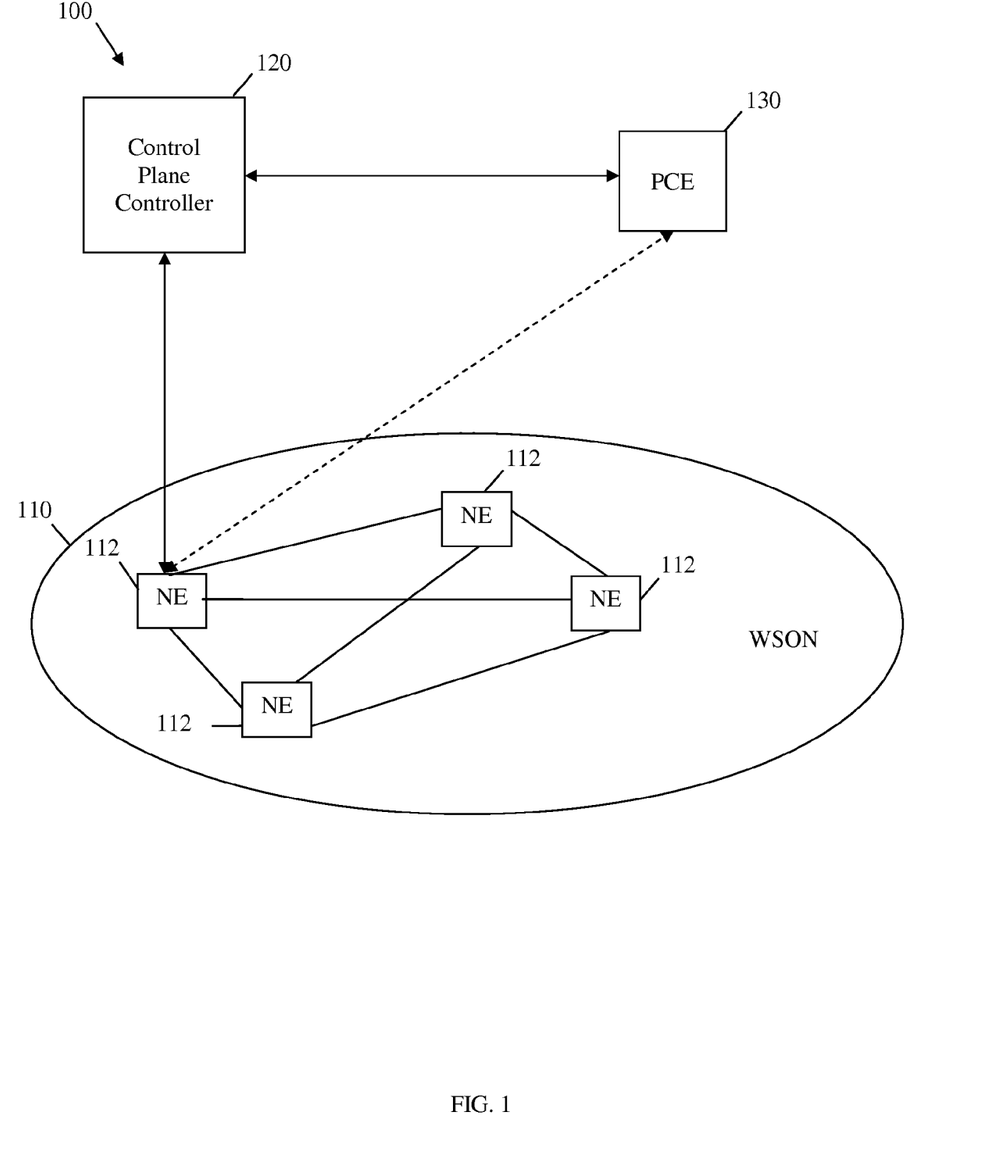
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any number of NEs 112.

The WSON 110 may be any optical network that uses active or passive components to transport optical signals. The WSON 110 may implement WDM to transport the optical signals through the WSON 110, and may comprise various optical components as described in detail below. The WSON 110 may be part of a long haul network, a metropolitan network, or a residential access network.

The NEs 112 may be any devices or components that transport signals through the WSON 110. In an embodiment, the NEs 112 consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters as such may reduce the cost and complexity of the WSON 110. In specific embodiments, the NEs 112 may comprise optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

The NEs 112 may be coupled to each other via optical fibers. The optical fibers may be used to establish optical links and transport the optical signals between the NEs 112. The optical fibers may comprise standard single mode fibers (SMFs) as defined in International Telecommunications Union Telecommunications Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane controller 120 may coordinate activities within the WSON 110. Specifically, the control plane controller 120 may receive optical connection requests and provide lightpath signaling to the WSON 110 via an Interior Gateway Protocol (IGP) such as Generalized Multi-Protocol Label Switching (GMPLS), thereby coordinating the NEs 112 such that data signals are routed through the WSON 110 with little or no contention. In addition, the control plane controller 120 may communicate with the PCE 130 using PCEP, provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive the wavelength or other information that may be used for the RWA from the control plane controller 120, from the NEs 112, or both. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA information may be sent to the PCE 130 by a path computation client (PCC). The PCC may be any client application requesting a path computation to be performed by the PCE 130. The PCC may also be any network component that makes such a request, such as the control plane controller 120, or any NE 112, such as a ROADM or a FOADM.

Figure 2:
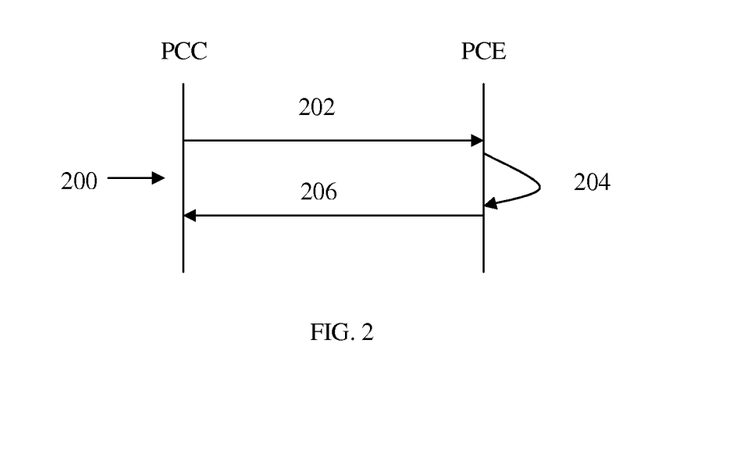
FIG. 2 is a protocol diagram of an embodiment of the communications between a PCE and a PCC.

FIG. 2 illustrates an embodiment of a path computation communication method 200 between the PCC and the PCE. The method 200 may be implemented using any suitable protocol, such as the PCEP. In the method 200, the PCC may send a path computation request 202 to the PCE. The path computation request may direct the PCE to calculate a path through the network. The path computation request may comprise an impairment validation request that directs the PCE to perform an impairment validation of a certain network path, for example, the calculated path. The impairment validation request may direct the PCE to validate the path by considering a type of optical signal quality of the path such as Bit Error Limit (BER), Optical Signal to Noise Ratio (OSNR), OSNR margin, Polarization-Mode Dispersion (PMD), Quality Factor (Q factor), or combinations thereof. The impairment validation request may also comprise a threshold that a path or that each path link needs to meet to be validated. For example, the threshold may indicate the minimum or maximum acceptable value for the signal quality of each type for path level or link level. At 204, the PCE may calculate a path through the network that meets the lightpath constraints. For example, the PCE may calculate the RWA. The PCE may then perform an impairment validation on the path based on the type of optical signal quality indicated in the path computation request 202. The PCE may send a path computation reply 206 to the PCC. The reply 206 may comprise the RWA, data indicating the impairment validations performed, the result of the validations, and the estimated impairment data associated with the network path or the network path's links.

When a network comprises a plurality of PCEs, not all PCEs within the network may have the ability to calculate the RWA. Therefore, the network may comprise a discovery mechanism that allows the PCC to determine the PCE in which to send the request 202. For example, the discovery mechanism may comprise an advertisement from a PCC for a RWA-capable PCE, and a response from the PCEs indicating whether they are RWA-capable. The discovery mechanism may be implemented as part of the method 200 or as a separate process.

Figure 3:
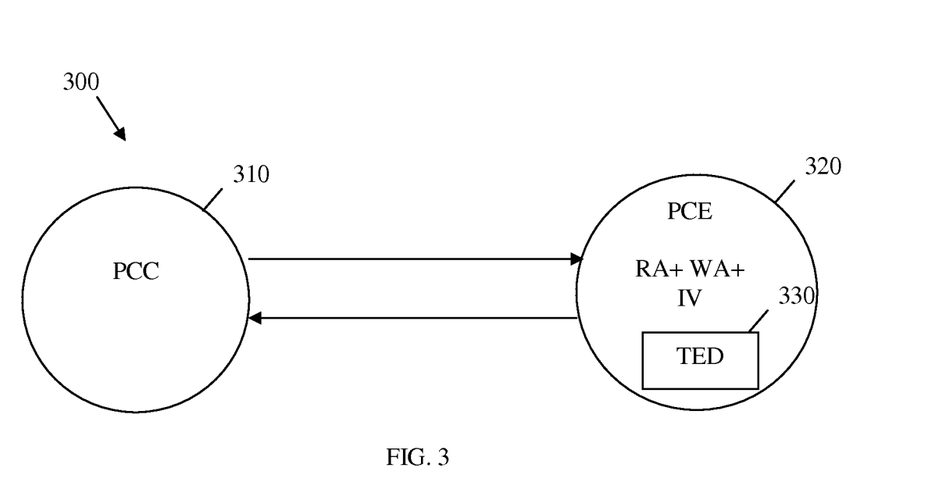
FIG. 3 is a schematic diagram of an embodiment of a PCE architecture.

The PCE may be embodied in one of several architectures as described in Internet Engineering Task Force (IETF) documents request for comment (RFC) 6566, which is incorporated by reference. FIG. 3 illustrates an embodiment of a combined RWA architecture 300. In the combined RWA architecture 300, the PCC 310 communicates the RWA request and the required information to the PCE 320, which implements the routing assignment, the wavelength assignment, and the impairment validation functions using a single computation entity, such as a processor. For example, the processor may process the RWA information using a single or multiple algorithms to compute the lightpaths as well as to assign the optical wavelengths for each lightpath. The amount of RWA information needed by the PCE 320 to compute the RWA may vary depending on the algorithm used. If desired, the PCE 320 may not compute the RWA until sufficient network links are established between the NEs or when sufficient RWA information about the NEs and the network topology is provided.

The PCE 320 may comprise a traffic engineering database (TED) 330. The TED may store information related to NEs and network links, including topology information, link state information, and/or physical characteristics of the NEs and links, such as optical impairment data, switching capabilities, etc. The TED may be used for traffic engineering and may be updated by the NEs in the network using Open Shortest Path First (OSPF) and similar interior gateway protocols (IGPs). The PCE 320 may use data stored in the TED when performing impairment validation on a computed lightpath.

Figure 4:
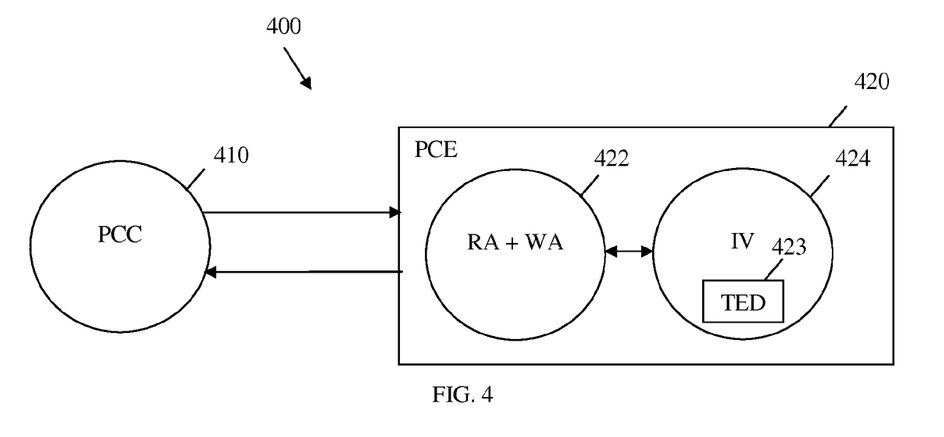
FIG. 4 is a schematic diagram of another embodiment of the PCE architecture.

FIG. 4 illustrates an embodiment of a separated RWA architecture 400. In the separated RWA architecture 400, the PCC 410 communicates the RWA request comprising an impairment validation request to the PCE 420, which implements the routing function, the wavelength assignment function, and the impairment validation function using separate computation entities, such as processors 422 and 424. Alternatively, the separated RWA architecture 400 may comprise two separate PCEs 420 each comprising one of the processors 422 and 424. Implementing routing RWA separately from impairment validation may offload some of the computational burden on the processors 422 and 424 and reduce the processing time. Additionally, separating RWA from impairment validation may be necessary in some network embodiments because of impairment sharing constraints. In an embodiment, the PCC 410 may be aware of the presence of only one of two processors 422, 424 (or two PCEs) and may only communicate with that processor 422, 424 (or PCE). For example, the PCC 410 may send the RWA and impairment validation request to the processor 422, which may act as a coordinator by computing lightpath routes and wavelength assignments. The processor 422 may forward the computed routes and wavelengths assignments along with the impairment validation request to the processor 424 where impairment validation is performed. The impairment validation may be of the type or types indicated in the RWA request sent by the PCC 410 and may be performed using impairment data stored in a local TED 423. The RWA and impairment validation results may then be passed back to the processor 422 and then to the PCC 410. Such an embodiment may also be reversed such that the PCC 410 communicates with the processor 424 instead of the processor 422. In addition to the impairment and RWA request data discussed above, computation requests transmitted between PCEs 422 and 424 (e.g. PCEP computation requests) may include data indicating whether more than one source-destination path should be computed, data indicating a maximum number of impairment validated paths to be returned, and/or wavelength constraints associated with RWA. Replies transmitted between PCEs 422 and 424 (e.g. PCEP replies) may comprise optical impairment validated paths, wavelength constraints for the optical impairment validated paths, and/or data indicating that no path is found when impairment validation is unsuccessful for all computed paths.

In either architecture 300 or 400, the PCC 310 or 410 may receive a route from the source to destination along with the wavelengths, e.g. GMPLS generalized labels, to be used along portions of the path. The GMPLS signaling supports an explicit route object (ERO). Within an ERO, an ERO label sub-object can be used to indicate the wavelength to be used at a particular NE. The PCC 310 or 410 may also receive a communication indicating whether the impairment validation was successful and indicating the path's optical impairment value.

Figure 5:
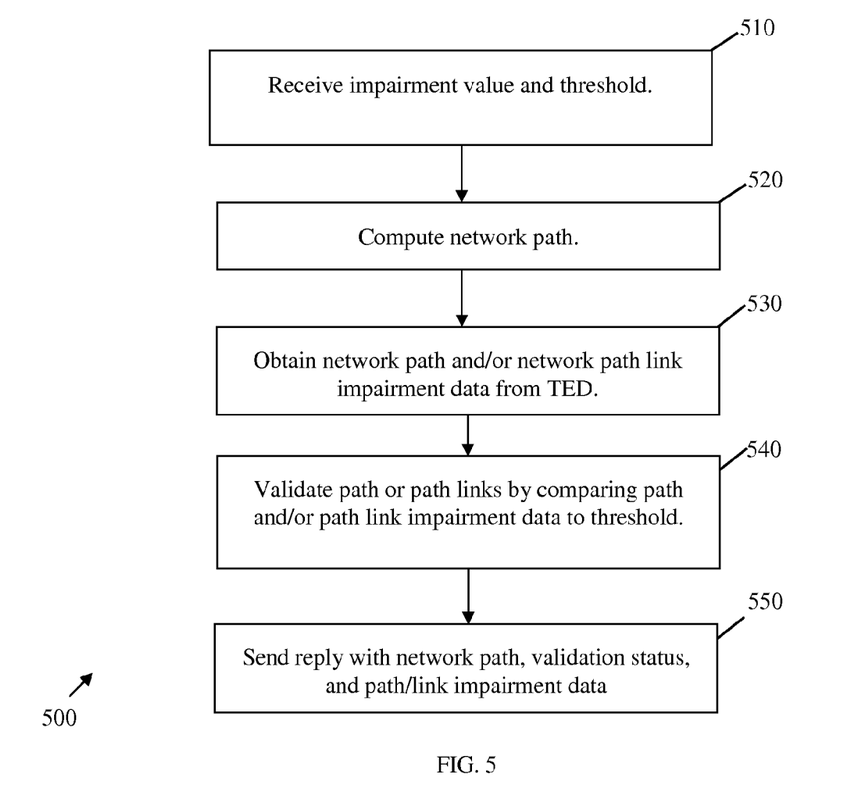
FIG. 5 is a flowchart of an impairment validation process.

FIG. 5 is a flowchart of an impairment validation process 500, which may be implemented by a PCE. The process 500 may begin at block 510 when a path computation request is received (e.g. from a PCC). For example, the path computation request may be a PCEP path computation request. As an example embodiment, the path computation request may comprise at least one impairment value and/or at least one threshold value. The impairment value may comprise an optical signal quality type that the PCC wishes to validate, and the threshold may comprise the minimum or maximum acceptable path or link optical signal quality. The optical signal quality type may comprise a BER, OSNR, PMD, Q factor, or combinations thereof. In a specific embodiment, OSNR may comprise a margin, which may be an additional value added to OSNR to account for unpredictable path degradation and other degradation not included in validation estimates. A margin may be from about three to about six decibels (dB).

The process 500 may then compute a network path at block 520. The process 500 may obtain impairment data for the network path and/or the network path's links from the PCE's TED at block 530. The impairment data may be of the optical signal quality type indicated by the path computation request. At block 540, the PCE may validate the path or the path links by comparing the network path/link impairment data to the threshold. Specifically, the process 500 may consider cumulative network path impairment data, impairment data for each network path link, or both. The process 500 may then send a reply (e.g. a PCEP path computation reply to the PCC) with the impairment validation results at block 550. The reply may comprise data indicating whether the network path and/or network path links were successfully validated (e.g the optical signal qualities of the path or links are below/above a maximum/minimum threshold value, respectively). The reply may also comprise the estimated optical signal impairment value of the calculated network path or network path link. Alternatively or additionally, a path computation request may include multiple impairment values and thresholds. In that case, the PCE obtains data of each type requested, validates the network path/links for each impairment type requested, and replies with the results of each validation.

Figure 6:
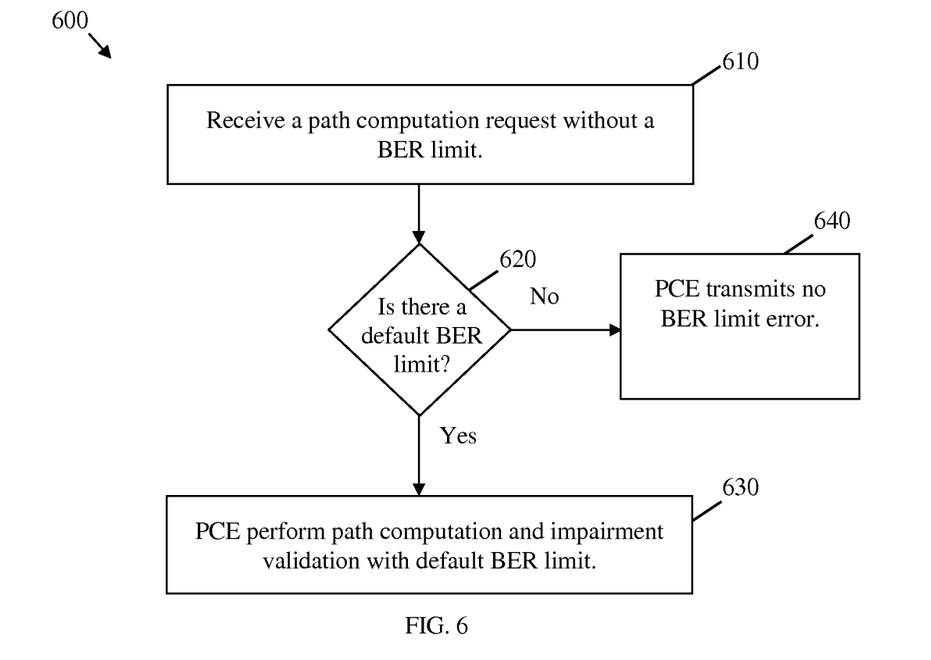
FIG. 6 is a flowchart of an impairment validation error process.

FIG. 6 is a flowchart of an impairment validation error process 600, which may be implemented by a PCE. The process 600 may begin at block 610 when a path computation request that does not comprise a BER limit is received (e.g. from a PCC). The process 600 may then determine whether a default BER limit exists at block 620. If a default BER limit threshold exists (e.g. at the PCE), the process may proceed to block 630 where the process 600 may compute the lightpath and perform impairment validation using the default BER limit threshold. The process 600 may then proceed with substantially the same steps discussed in process 500. If there is not a default BER limit threshold at block 620, then the process may proceed to block 640 and transmit an error message, (e.g. to the PCC or a network administrator, indicating that no BER limit has been specified.

Figure 7:
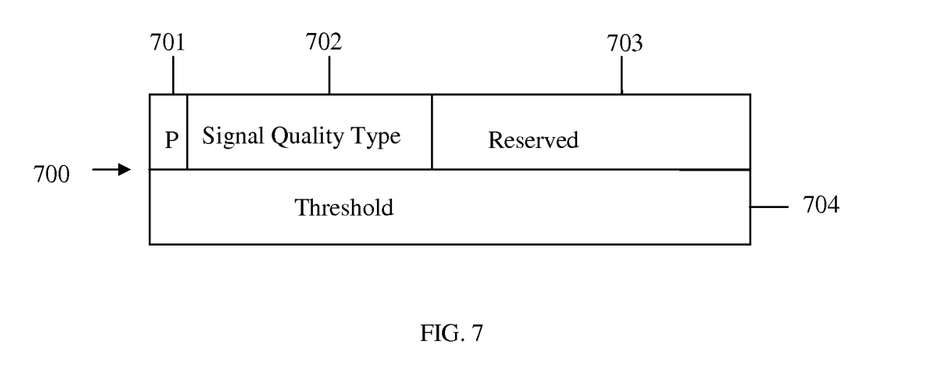
FIG. 7 illustrates an embodiment of an encoding for a signal quality request TLV.

FIG. 7 illustrates an embodiment of an encoding for a signal quality request TLV 700, which may be included in a PCEP path computation request (e.g. the path computation request of block 510 of process 500) and may be treated by a PCE as an impairment validation request. The signal quality request TLV 700 may comprise a plurality of thirty-two bit sections, each numbered from bit position zero to bit position thirty one, and a plurality of fields/bits positioned in the sections. The signal quality request TLV 700 may comprise a pass (P) bit 701, which may be located at bit position zero, and may be set to one to indicate a requested impairment validation should be performed at the network path level and zero to indicate the impairment validation should be performed at the network path link level. The signal quality request TLV 700 may comprise a Signal Quality Type field 702, which may be sixteen bits long, may be extend from bit position one to bit position sixteen, and may indicate the type of impairment validation to be performed. The Signal Quality Type field 702 may be set to a value of one to indicate BER limit, two to indicate OSNR plus margin, three to indicate PMD, or four to indicate Q factor. The signal quality request TLV 700 may comprise a Reserved field 703, which may be fifteen bits long and may be extend from bit position seventeen to bit position thirty-one. The Reserved field 703 may be reserved for other purposes. The signal quality request TLV 700 may comprise a Threshold field 704 which may be thirty two bits long, may be extend from bit position zero to bit position thirty-one, and may indicate the minimum or maximum acceptable signal quality value of the type indicated in the Signal Quality Type field 702 for path level or link level.

Figure 8:
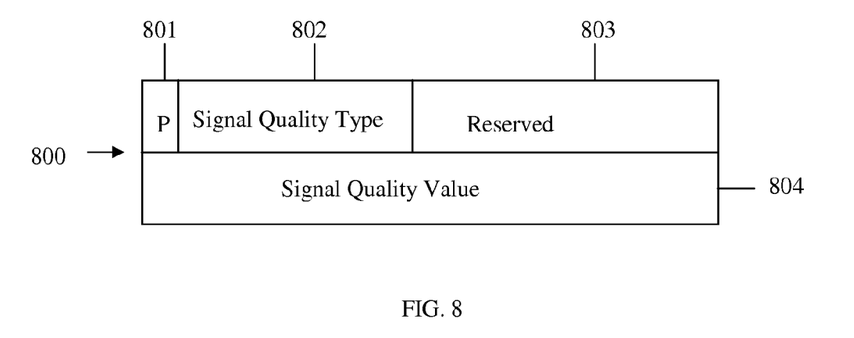
FIG. 8 illustrates an embodiment of an encoding for a signal quality reply TLV.

FIG. 8 illustrates an embodiment of an encoding for a signal quality reply TLV 800, which may comprise the results of an impairment validation and may be sent (e.g. by a PCE to a PCC in block 550 of process 500) as part of a PCEP path computation reply. The signal quality request TLV 800 may comprise a plurality of thirty-two bit sections, each numbered from bit position zero to bit position thirty one, and a plurality of fields/bits positioned in the sections. The signal quality reply TLV 800 may comprise a P bit 801, which may be located at bit position zero, and may be set to one to indicate that an associated impairment validation was successful and set to two to indicate an associated impairment validation was not successful. The signal quality reply TLV 800 may comprise a Signal Quality Type field 802, which may be sixteen bits long, may be extend from bit position one to bit position sixteen, and may indicate the type of impairment validation performed. The Signal Quality Type field 802 may be set to a value of one to indicate BER limit, two to indicate OSNR plus margin, three to indicate PMD, or four to indicate Q factor. The signal quality reply TLV 800 may comprise a Reserved field 803, which may be fifteen bits long and may be extend from bit position seventeen to bit position thirty-one. The Reserved field 803 may be reserved for other purposes. The signal quality reply TLV 800 may comprise a Signal Quality value field 804, which may be thirty two bits long, may be extend from bit position zero to bit position thirty-one, and may indicate the estimated optical signal quality of an associated network path.

Figure 9:
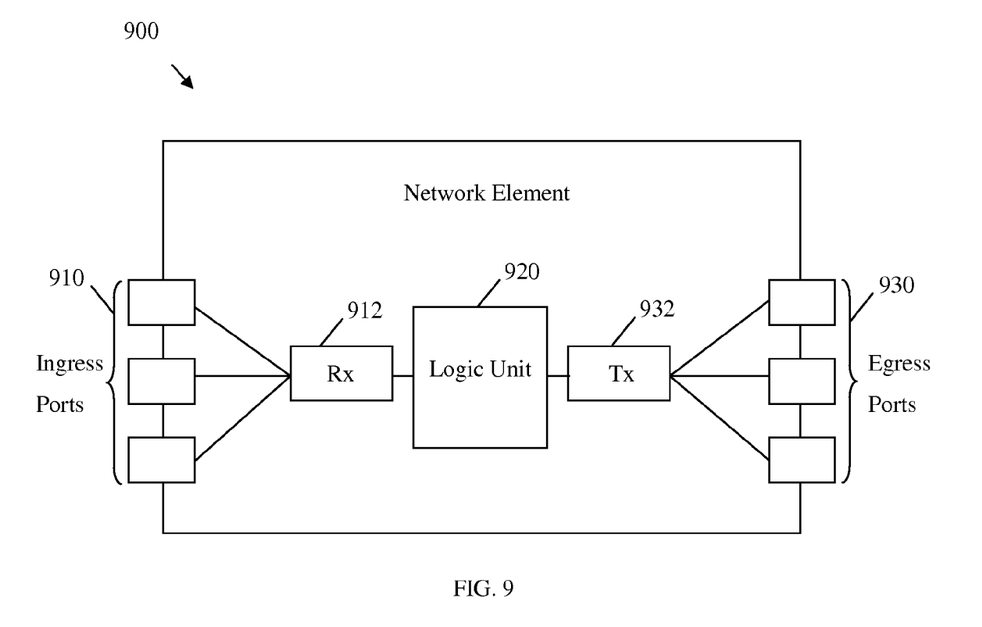
FIG. 9 is a schematic diagram of an embodiment of an NE.

FIG. 9 is a schematic diagram of an embodiment of an NE 900, which may function as a node in network 100, 300, and/or 400. NE 900 may function as a PCE, PCC, and/or any of the NE's disclosed herein. One skilled in the art will recognize that the term NE encompasses a broad range of devices of which NE 900 is merely an example. NE 900 is included for purposes of clarity of discussion, but is in no way meant to limit the application of the present disclosure to a particular NE embodiment or class of NE embodiments. At least some of the features/methods described in the disclosure may be implemented in a network apparatus or component, such as an NE 900. For instance, the features/methods in the disclosure may be implemented using hardware, firmware, and/or software installed to run on hardware. The NE 900 may be any device that transports frames through a network, e.g., a switch, router, bridge, server, etc. As shown in FIG. 9, the NE 900 may comprise a receiver (Rx) 912 coupled to plurality of ingress ports 910 for receiving frames from other nodes, a logic unit 920 coupled to the receiver to determine which nodes to send the frames to, and a transmitter (Tx) 932 coupled to the logic unit 920 and to plurality of egress ports 930 for transmitting frames to the other nodes. The logic unit 920 may comprise one or more multi-core processors and/or memory devices, which may function as data stores. The logic unit 920 may be implemented using hardware, software, or both. The ingress ports 910 and/or egress ports 930 may contain electrical and/or optical transmitting and/or receiving components. NE 900 may or may not be a routing component that makes routing decisions. In an example embodiment, when the NE 900 functions as a PCE, the logic unit 920 in the NE 900 may implement some or all of the processes of the method disclosed herein such as impairment validation process 500 and impairment validation error process 600. In an example embodiment, the logic unit 920 in the NE 900 may implement some or all of the processes performed by the PCE 320 disclosed in the architecture 300, or by the PCE 420 in the architecture 400. Alternatively, in an example embodiment, the NE 900 functions as a PCC, the logic unit 920 in the NE 900 may implement some or all of the processes performed by the PCC 310 disclosed in the architecture 300, or by the PCC 410 in the architecture 400.

Figure 10:
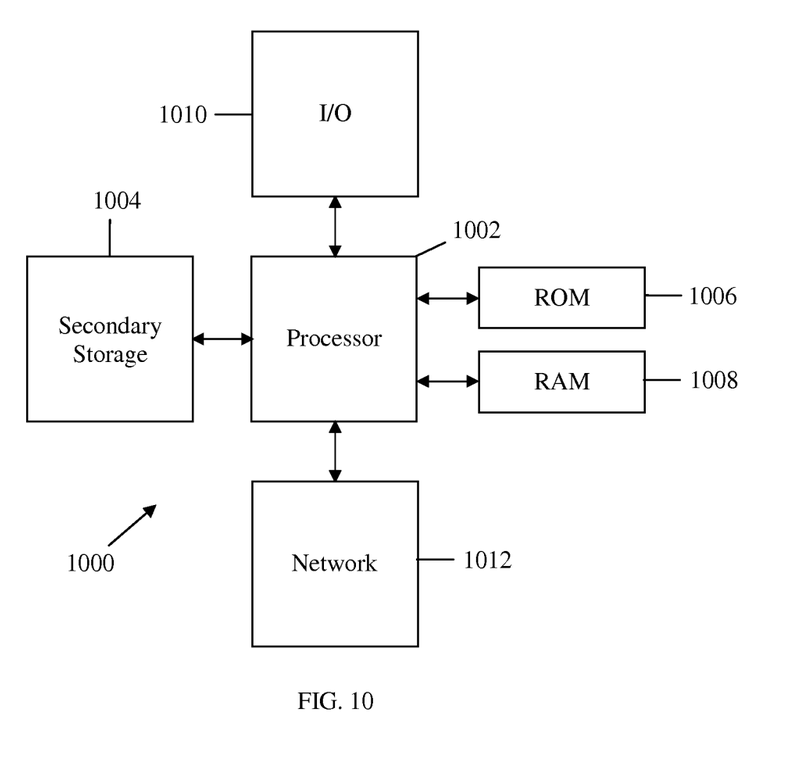
FIG. 10 is a schematic diagram of an embodiment of a general-purpose computer system.

The network components and methods described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components and methods disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs), and/or digital signal processors (DSPs). The processor 1002 may be used to implement the methods disclosed herein such as impairment validation process 500 and impairment validation error process 600. The processor 1002 may also be used to implement some or all of the processes performed by the PCC 310 disclosed in the architecture 300 by the PCC 410 in the architecture 400, by the PCE 320 disclosed in the architecture 300, and/or by the PCE 420 in the architecture 400.

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a receiver configured to receive a path computation element (PCE) protocol (PCEP) path computation request from a path computation client (PCC), wherein the path computation request comprises an impairment validation request that directs a PCE to perform an impairment validation of a network path;
a processor coupled to the receiver and configured to implement the PCE by:
computing the network path after receiving the path computation request; and
performing the impairment validation of the network path specified by the impairment validation request; and
a transmitter coupled to the processor and configured to transmit a PCEP reply to the PCC,
wherein the PCEP reply comprises an estimated optical signal impairment value resulting from the impairment validation of the computed network path,
wherein the impairment validation request comprises a first type length value (TLV), wherein the first TLV comprises:

a first Signal Quality Type field that comprises a type of signal quality of the computed network path which indicates a first type of impairment validation to be performed;
a first Threshold field that comprises a threshold value, and a first pass (P) bit that comprises an indicator, and
wherein the impairment validation request directs the PCE to perform a second network path impairment validation, and
wherein the impairment validation request comprises a second TLV that comprises a second Signal Quality Type field that comprises a second type of signal quality of the network path, a second Threshold field that comprises a second threshold value, and a second P bit that comprises a second indicator.

2. The apparatus of claim 1, wherein the PCEP reply further comprises the computed network path and data indicating whether validations of the network path was successful or unsuccessful.

3. The apparatus of claim 1, wherein the PCE is configured to perform impairment validations of the network path based on the types of signal quality.

4. The apparatus of claim 3, wherein the types of signal quality of the network path comprises at least one of Bit Error Rate (BER), Optical Signal to Noise Ratio (OSNR), OSNR margin, Polarization-Mode Dispersion (PMD), and Quality Factor (Q factor).

5. The apparatus of claim 1, wherein the impairment validation request comprises indicators that indicate whether the impairment validations should be performed at a network path level or at a network path link level, and wherein the PCE performs the impairment validation of the network path based on the indicators.

6. The apparatus of claim 5, wherein the PCE performs the impairment validations of the network path based on the indicator by performing a validation of each link in the network path.

7. The apparatus of claim 5, wherein the PCE performs the impairment validations of the network path based on at least one of the indicators by performing a cumulative validation of all links in the network path.

8. The apparatus of claim 4, wherein the threshold values indicate a minimum or maximum value of signal quality of a network path or a network path link should satisfy, and wherein the PCE performs the impairment validations of the network path based on the threshold value.

9. The apparatus of claim 8, wherein the PCE performs each impairment validation of the network path based on the associated threshold value by comparing a signal quality value of the network path, at a path level or at a link level, to the threshold value, wherein when the threshold value comprises a minimum value, the impairment validation is successful when the signal quality value is greater than or equal to the threshold value.

10. The apparatus of claim 8, further comprising a memory coupled to the processor and comprising a traffic engineering database (TED), wherein the TED comprises network impairment data, and wherein the PCE employs the network impairment data to determine a signal quality value of the network path.

11. The apparatus of claim 1, wherein the transmitter is further configured to transmit an error to the PCC when the path computation request does not comprise a Bit Error Rate (BER).

12. A method comprising:
sending, by a path computation client (PCC), a path computation element protocol (PCEP) path computation request to a path computation element (PCE), wherein the request directs the PCE to perform routing and wavelength assignment (RWA) and a first impairment validation of a computed network path resulting from the RWA, wherein a type length value (TLV) is included in the request, wherein the TLV comprises:
a first Signal Quality Type field that comprises a type of signal quality of the computed network path which indicates a type of the first impairment validation to be performed; a first Threshold field that comprises a threshold value, and a first pass (P) bit that comprises an indicator, and wherein the request directs the PCE to perform a second network path impairment validation, and wherein the TLV further comprises a second Signal Quality Type field that comprises a second type of signal quality of the network path, a second Threshold field that comprises a second threshold value, and a second P bit that comprises a second indicator; and receiving, by the PCC, a PCEP reply from the PCE, wherein the PCEP reply comprises the computed network path and an estimated optical signal impairment value resulting from the requested validation of the computed network path.

13. The method of claim 12, wherein the types of signal quality of the computed network path comprises at least one of Bit Error Rate (BER), Optical Signal to Noise Ratio (OSNR), OSNR margin, Polarization-Mode Dispersion (PMD), and Quality Factor (Q factor).

14. The method of claim 12, wherein the indicators indicate whether the impairment validation should be performed at a network path level or at a network path link level.

15. The method of claim 14, wherein the threshold values indicate a minimum or maximum value of the computed network path or a network path link of the computed network path needs to satisfy to be validated.

16. A method comprising: receiving a path computation request from a path computation client (PCC), wherein the request comprises a first type length value (TLV), wherein the first TLV comprises: a first Signal Quality Type field that comprises a type of signal quality of a network path to be computed which indicates a first type of impairment validation to be performed; a first Threshold field that comprises a threshold value, and a first pass (P) bit that comprises an indicator, and wherein the request directs a path computation element (PCE) to perform a second network path impairment validation, and wherein the request further comprises a second TLV that comprises a second Signal Quality Type field that comprises a second type of signal quality of the network path, a second Threshold field that comprises a second threshold value, and a second P bit that comprises a second indicator; performing, by the PCE, a first and second impairment validations of a computed network path; and after performing the network path impairment validations, sending, by the PCE, a path computation element protocol (PCEP) reply to the PCC, wherein the reply comprises a first indicator that indicates whether the first network path impairment validation is successful, and wherein the reply further comprises a first estimated value of a signal quality of the network path or a link of the network path.

17. The method of claim 16, wherein the reply further comprises a first signal quality type which indicates a type of signal quality used during the first network path impairment validation.

18. The method of claim 16, wherein a TLV is included in the reply, and wherein the TLV comprises: a Signal Quality Type field that comprises a type of signal quality used during the first network path impairment validation; a Signal Quality Value field that comprises the first estimated value of the first signal quality; and a P bit that comprises the first indicator.

19. The method of claim 17, wherein the reply further comprises: a second signal quality type which indicates a type of signal quality used during the second network path impairment validation; and a second estimated value of the second signal quality of the network path or a link of the network path.

20. The method of claim 19, wherein the reply further comprises a second indicator, and wherein the second indicator indicates whether the second network path impairment validation was successful.

21. A method comprising: receiving, by a path computation element (PCE), a path computation element protocol (PCEP) path computation request (PCReq) message, wherein the PCReq message includes a first signal quality measure type length value (TLV) that describes a first measure of signal quality to which computed paths should conform, wherein the first signal quality measure TLV comprises: a pass (P) bit that indicates if the signal quality impairment is a path level; a Signal Quality Type field that indicates a kind of signal quality impairment; and a Threshold field that indicates a threshold that the signal quality measurement for a path or a link must satisfy, wherein the PCReq message includes a second signal quality measure TLV that describes a second measure of signal quality to which computed paths should conform, wherein the second signal quality measure TLV comprises: a second Signal Quality Type field that indicates a second kind of signal quality impairment, a second P bit, and a second Threshold field; and
  sending, by the PCE, a PCEP path computation reply (PCRep) message to a path computation client (PCC) in response to the PCReq message, wherein the PCRep message comprises a computed path, wavelengths assigned to the path, an indicator that indicates whether the computed path conforms to the signal quality of the PCReq message, wherein the PCRep message comprises a signal quality measure TLV, and wherein the signal quality measure TLV comprises: a P bit that indicates whether a signal quality measurement has passed a threshold; a Signal Quality Type field that indicates a kind of signal quality impairment; and a Signal Quality Value field that indicates an estimated value of the signal quality measurement for the computed path.

22. The method of claim 21, wherein the PCReq comprises at least one of a Bit Error Rate (BER), an Optical Signal to Noise Ratio (OSNR), an OSNR margin, a Polarization-Mode Dispersion (PMD), and a Quality Factor (Q factor).

23. The method of claim 21, wherein the PCReq message does not comprise a Bit Error Rate (BER) limit, wherein no default BER limit is provisioned at the PCE, and wherein the method further comprises sending, by the PCE, an error message specifying that the BER limit should be provided.

24. The method of claim 21, further comprising receiving a second PCReq message from a Routing and Wavelength Assignment (RWA) coordinating PCE, and wherein the second PCReq message comprises: an indicator that indicates whether more than one computed path is desired;
  a limit to the number of optical impairment qualified computed paths to be returned in the PCRep message; and a specified path and wavelength to be qualified by the PCE.

25. The apparatus of claim 8, wherein the PCE performs the impairment validations of the network path based on the threshold values by comparing a signal quality value of the network path, at a path level or at a link level, to each threshold value, and wherein when one of the threshold values comprises a maximum value, the associated impairment validation is successful when the signal quality value is less than or equal to the threshold value.

\* \* \* \* \*